(12) United States Patent
Fiatal et al.

(10) Patent No.: US 11,477,173 B2
(45) Date of Patent: *Oct. 18, 2022

(54) SYSTEM AND SERVER FOR MANAGING COMMUNICATIONS BETWEEN END USER DEVICES

(71) Applicant: Seven Networks, LLC, Marshall, TX (US)

(72) Inventors: Trevor A. Fiatal, Fremont, CA (US); Lee R. Boynton, Lake Oswego, OR (US); Scott M. Burke, Mountain View, CA (US); Brian D. Gustafson, Montara, CA (US); Binu Raj, Fremont, CA (US); William Alvarado, Menlo Park, CA (US); Juan Benitez, San Jose, CA (US); Fred J. Duncan, San Francisco, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,144

(22) Filed: Jun. 24, 2020

(65) Prior Publication Data

US 2020/0328782 A1    Oct. 15, 2020

Related U.S. Application Data

(63) Continuation of application No. 16/902,399, filed on Jun. 16, 2020, which is a continuation of application
(Continued)

(51) Int. Cl.
*H04L 9/40* (2022.01)
*H04L 9/32* (2006.01)
(Continued)

(52) U.S. Cl.
CPC ........ *H04L 63/0428* (2013.01); *H04L 9/3226* (2013.01); *H04L 63/029* (2013.01);
(Continued)

(58) Field of Classification Search
CPC .......... G06F 15/17312; G06F 13/4081; G06F 17/30174; G06F 1/3203; G06F 1/3215;
(Continued)

(56) References Cited

U.S. PATENT DOCUMENTS 6,138,158 A    10/2000   Boyle et al.
6,148,408 A    11/2000   Shimoda
(Continued)

OTHER PUBLICATIONS

Wicker, Stephen; Excerpts from Opening Expert Report of Stephen B. Wicker and Related Exhibits Regarding U.S. Pat. Nos. 10,039,029, 10,091,734, 9,438,550 9,516,127, 9,648,557—Redacted; Civil Action No. 2:19-cv-115-JRG; *Seven Networks, LLC* Plaintiff, v. *Apple Inc.* Defendant; Jun. 15, 2020.
(Continued)

*Primary Examiner* — Fred A Casca
(74) *Attorney, Agent, or Firm* — NK Patent Law (57) ABSTRACT

A system and server for managing communications between end user devices where first and second connections and associated message.

26 Claims, 6 Drawing Sheets

Related U.S. Application Data

No. 16/244,149, filed on Jan. 10, 2019, now Pat. No. 10,720,974, which is a continuation of application No. 16/008,014, filed on Jun. 13, 2018, now abandoned, which is a continuation of application No. 15/338,238, filed on Oct. 28, 2016, now Pat. No. 10,110,534, which is a continuation of application No. 14/623,514, filed on Feb. 17, 2015, now Pat. No. 9,608,968, which is a continuation of application No. 11/470,802, filed on Sep. 7, 2006, now Pat. No. 8,989,728, which is a continuation of application No. 10/339,368, filed on Jan. 8, 2003, now Pat. No. 7,139,565.

(60) Provisional application No. 60/403,249, filed on Aug. 12, 2002, provisional application No. 60/346,881, filed on Jan. 8, 2002.

(51) Int. Cl.

| | |
|---|---|
| *H04W 12/03* | (2021.01) |
| *H04W 4/12* | (2009.01) |
| *H04W 88/06* | (2009.01) |
| *H04L 67/04* | (2022.01) |
| *H04B 7/04* | (2017.01) |
| *H04B 7/06* | (2006.01) |
| *H04B 7/0417* | (2017.01) |
| *H04W 76/10* | (2018.01) |
| *H04W 12/04* | (2021.01) |
| *H04L 67/1095* | (2022.01) |
| *H04L 67/14* | (2022.01) |
| *H04L 69/329* | (2022.01) |
| *H04L 51/58* | (2022.01) |
| *H04W 52/02* | (2009.01) |

(52) U.S. Cl.
CPC ...... *H04L 63/0272* (2013.01); *H04L 63/0464* (2013.01); *H04L 63/0471* (2013.01); *H04L 63/08* (2013.01); *H04L 63/0807* (2013.01); *H04W 12/03* (2021.01); *H04B 7/04* (2013.01); *H04B 7/0417* (2013.01); *H04B 7/0617* (2013.01); *H04L 51/58* (2022.05); *H04L 63/0281* (2013.01); *H04L 67/04* (2013.01); *H04L 67/1095* (2013.01); *H04L 67/14* (2013.01); *H04L 69/329* (2013.01); *H04W 4/12* (2013.01); *H04W 12/04* (2013.01); *H04W 52/0261* (2013.01); *H04W 76/10* (2018.02); *H04W 88/06* (2013.01); *Y02D 10/00* (2018.01); *Y02D 30/70* (2020.08)

(58) Field of Classification Search
CPC .... G06F 1/325; G06F 11/0757; G06F 1/3237; G06F 1/3265; G06F 21/10; G06F 1/3296; G06F 1/3287; G06F 1/3259; H04L 63/08; H04L 67/1095; H04L 51/24; H04L 51/38; H04L 67/26; H04W 12/06; H04W 40/24; H04W 8/005; H04W 4/001; H04W 4/12; H04W 4/14; H04W 52/0232; H04W 52/0261; H04W 84/18; H04W 48/12; H04W 52/00; H04W 52/0219; H04W 52/0258; H04W 52/0277; H04W 52/028; H04W 52/0296; H04W 52/0264; H04W 52/0235; H04W 52/0254; H04W 52/322; H04W 24/10; H04W 28/0263; Y02B 60/1228; Y02B 60/165; Y02B 60/50; Y02B 60/1278; Y02B 60/144

See application file for complete search history.

(56) References Cited

U.S. PATENT DOCUMENTS

| | | | |
|---|---|---|---|
| 6,421,781 | B1 | 7/2002 | Fox et al. |
| 6,744,452 | B1 | 6/2004 | McBrearty et al. |
| 6,981,041 | B2* | 12/2005 | Araujo .................. H04L 29/06 709/222 |
| 7,007,083 | B1 | 2/2006 | Chesley |
| 7,058,036 | B1* | 6/2006 | Yu ....................... H04L 51/066 370/335 |
| 7,233,997 | B1 | 6/2007 | Leveridge et al. |
| 7,334,126 | B1 | 2/2008 | Gilmore et al. |
| 7,801,959 | B1* | 9/2010 | Lennie ................... H04L 51/24 709/206 |
| 2001/0032254 | A1 | 10/2001 | Hawkins |
| 2002/0038371 | A1 | 3/2002 | Spacey |
| 2002/0068559 | A1* | 6/2002 | Sharma ................. H04W 24/00 455/423 |
| 2002/0069213 | A1* | 6/2002 | Moslander ............... G06F 8/65 |
| 2002/0078388 | A1 | 6/2002 | Wickham |
| 2002/0174194 | A1* | 11/2002 | Mooney .................. H04L 51/36 709/219 |
| 2003/0225910 | A1* | 12/2003 | Pan ...................... H04L 61/1511 709/245 |

OTHER PUBLICATIONS

Foster, Ian; Excerpts from Opening Expert Report of Ian Foster, Ph.D., and Related Exhibits Regarding U.S. Pat. Nos. 9,608,968, 9,769,176, 9,712,476, 10,110,534, and 10,135,771—Redacted; Civil Action No. 2:19-cv-115-JRG; *Seven Networks, LLC* Plaintiff, v. *Apple Inc.* Defendant; Jun. 15, 2020.

Cordell, Ruffin; *Seven Networks, LLC* Plaintiff, v. *Apple Inc.* Defendant; Civil Action No. 2:19-cv-115-JRG; Apple's Reply in Support of its Motion to Strike Portions of Dr. Jones's Expert Reports Regarding Undisclosed Infringement Theories and Validity Contentions as to the U.S. Pat. No. 9,608,968, U.S. Pat. No. 9,712,476, and U.S. Pat. No. 10,135,771 Patents [D179]; Aug. 25, 2020; pp. 1-9.

Cordell, Ruffin; *Seven Networks, LLC* Plaintiff, v. *Apple Inc.* Defendant; Civil Action No. 2:19-cv-115-JRG; Apple's Reply in Support of its Motion to Strike Portions of Dr. Smith's Expert Reports Regarding Undisclosed Infringement Theories and Validity Contentions as to the U.S. Pat. No. 9,648,557 and U.S. Pat. No. 10,110,534 Patents [D175]; Aug. 25, 2020; pp. 1-8.

EPO, First Examination Report in European Application No. 18 159 312.0-1213 dated Feb. 22, 2021.

Renner, W. Karl, el al, Petition for Inter Partes Review of U.S. Pat. No. 10,110,534 Pursuant to 35 U.S.C. §§311-319, 37 C.F.R.§42, Dec. 5, 2019, pp. 1-84.

USPTO, Seven Networks, LLC, Patent Owner, *Apple Inc.* v. *Seven Networks, LLC*, IPR2020-00156, U.S. Pat. No. 10,110,534, Patent Owner Preliminary Response, Mar. 18, 2020, pp. 1-80.

USPTO, Seven Networks, LLC, Patent Owner, *Apple Inc.* v. *Seven Networks, LLC*, IPR2020-00156, U.S. Pat. No. 10,110,534, Patent Owner's Response to Petition for Inter Partes Review, Sep. 25, 2020, pp. 1-68.

USPTO, Dang, Thu A., et al., *Apple Inc.* v. *Seven Networks, LLC*, IPR2020-00156, U.S. Pat. No. 10,110,534 B1, Decision Granting Institution of Inter Partes Review 35 U.S.C. §314, Jun. 15, 2020, pp. 1-76.

Renner, W. Karl, el al, Petition for Inter Partes Review of U.S. Pat. No. 10,110,534 Pursuant to 35 U.S.C. §§311-319, 37 C.F.R.§42, Dec. 5, 2019, pp. 1-78.

USPTO, Seven Networks, LLC, Patent Owner, *Apple Inc.* v. *Seven Networks, LLC*, IPR2020-00157, U.S. Pat. No. 10,110,534, Patent Owner Preliminary Response, Mar. 18, 2020, pp. 1-81.

USPTO, Seven Networks, LLC, Patent Owner, *Apple Inc.* v. *Seven Networks, LLC*, IPR2020-00157, U.S. Pat. No. 10,110,534, Patent Owner's Response to Petition for Inter Partes Review, Sep. 25, 2020, pp. 1-73.

(56) References Cited

OTHER PUBLICATIONS

USPTO, Dang, Thu A., et al., *Apple Inc.* v. *Seven Networks, LLC*, IPR2020-00157, U.S. Pat. No. 10,110,534 B1, Decision Granting Institution of Inter Partes Review 35 U.S.C. §314, Jun. 15, 2020, pp. 1-78.

Motorola Invalidity Contentions for U.S. Pat. No. 9,602,457, dated Jun. 2022.

\* cited by examiner

SYSTEM AND SERVER FOR MANAGING COMMUNICATIONS BETWEEN END USER DEVICES

CROSS-REFERENCE TO RELATED APPLICATIONS

This application is a Continuation of U.S. patent application Ser. No. 16/902,399, filed Jun. 16, 2020, entitled "POWER SAVING MANAGEMENT FOR MOBILE DEVICES BASED ON BATTERY CHARGE REMAINING", which is a Continuation of U.S. patent application Ser. No. 16/244,149, filed Jan. 10, 2019, entitled "POWER SAVING MANAGEMENT FOR MOBILE DEVICES BASED ON BATTERY CHARGE REMAINING", which is a Continuation of U.S. patent application Ser. No. 16/008,014, filed Jun. 13, 2018, entitled "POWER SAVING MANAGEMENT FOR MOBILE DEVICES BASED ON BATTERY CHARGE REMAINING", which is a Continuation of U.S. patent application Ser. No. 15/338,238, filed Oct. 28, 2016, entitled "CONNECTION ARCHITECTURE FOR A MOBILE NETWORK", now U.S. Pat. No. 10,110,534, issued Oct. 23, 2018, which is a Continuation of U.S. patent application Ser. No. 14/623,514, filed Feb. 17, 2015, entitled "CONNECTION ARCHITECTURE FOR A MOBILE NETWORK", now U.S. Pat. No. 9,608,968, issued on Mar. 28, 2017, which is a Continuation of U.S. patent application Ser. No. 11/470,802, filed Sep. 7, 2006, entitled "CONNECTION ARCHITECTURE FOR A MOBILE NETWORK", now U.S. Pat. No. 8,989,728, issued on Mar. 24, 2015, which is a Continuation of U.S. application Ser. No. 10/339,368, filed Jan. 8, 2003, entitled "CONNECTION ARCHITECTURE FOR A MOBILE NETWORK", now U.S. Pat. No. 7,139,565, issued on Nov. 21, 2006, which claims the benefit of both U.S. Provisional Application No. 60/346,881 filed Jan. 8, 2002 and U.S. Provisional Application No. 60/403,249 filed Aug. 12, 2002.

BACKGROUND

Mobile email messaging systems typically use a store and forward architecture. Electronic Mail (email) redirector software runs either on an enterprise email server or on a desktop computer. The redirector software monitors a user mailbox. When a new email message is received in the mailbox, the redirector makes a copy of the email message and wraps the copy in an encryption envelope and encapsulates the copy for delivery to the mobile device. The redirector may optionally encrypt and/or digitally sign the encapsulated email message.

The encrypted encapsulated email message is sent out over the Internet and routed to a mobile device associated with the user mailbox. If encrypted, the email message is decrypted by the mobile device prior to being stored on the mobile device and then displayed and stored on the mobile device. This same process is repeated for every new email that is received in the user's mailbox.

Thus, with this architecture two versions of the same mailbox exist. The primary mailbox on the email server or desktop PC, and the replicated mailbox on the mobile device. Consistency between the primary and the replicated mailbox may be maintained to some degree using synchronization messages passing back and forth between the redirector and the mobile device. For example, an email message deleted from the mobile device may result in a synchronization message to the desktop redirector, which instructs it to also delete that message from the primary mailbox. In some versions of this architecture, no effort at all is made to ensure consistency of mailbox state between the primary and replicated instances. This store and forward architecture is cumbersome, does not operate in real-time, and requires sending a large number of email messages over the Internet. The present invention addresses this and other problems associated with the prior art.

SUMMARY

A real-time communication architecture establishes a continuous connection between an enterprise network and a communication management system. The connection is continuously held open allowing mobile devices real-time access to enterprise data sources such as email systems. The real-time communication architecture can support an entire enterprise email system or individual email users.

The foregoing and other objects, features and advantages of the invention will become more readily apparent from the following detailed description of a preferred embodiment of the invention which proceeds with reference to the accompanying drawings.

DETAILED DESCRIPTION

Figure 1:
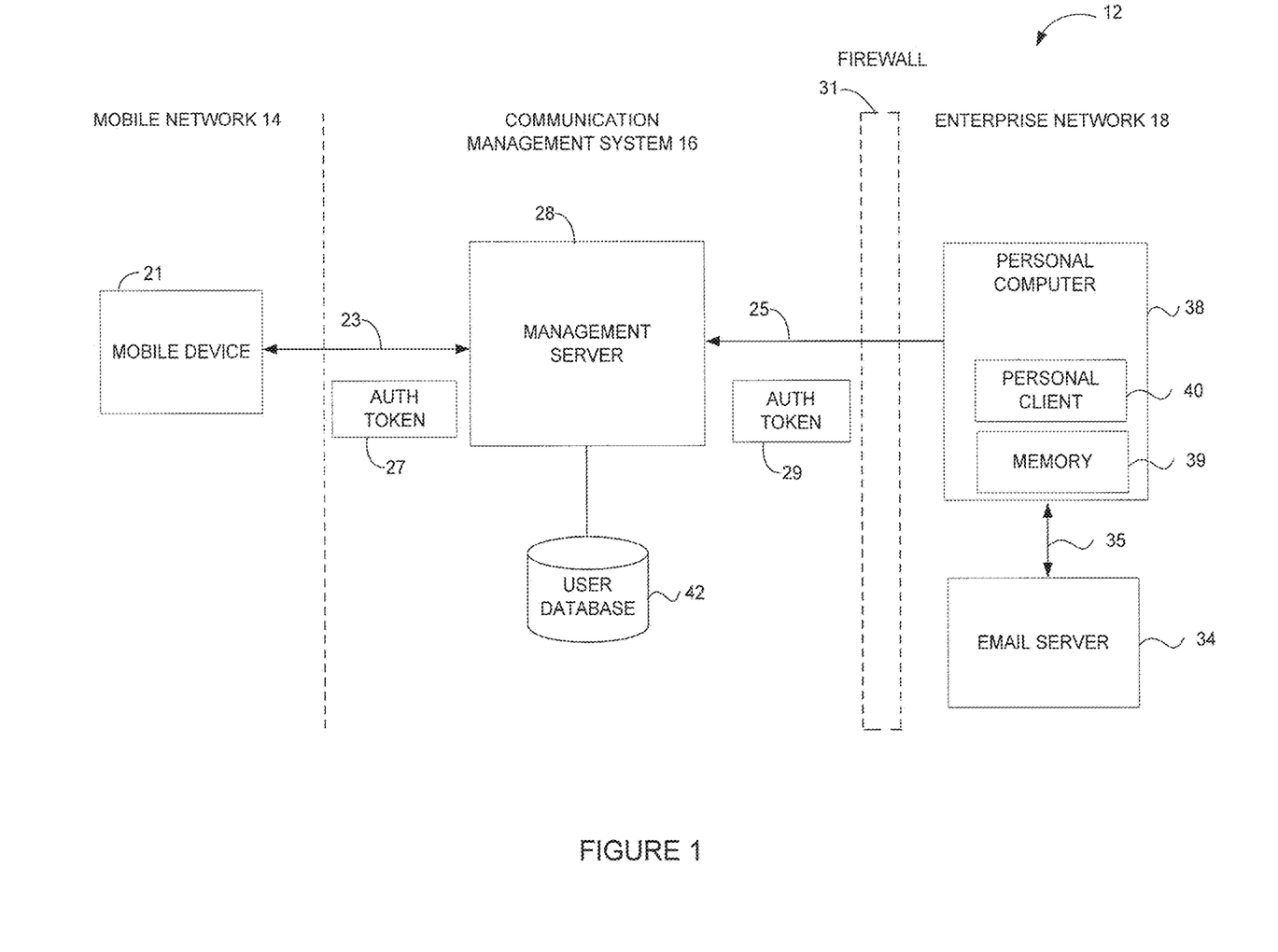
FIG. 1 is a block diagram of a mobile communication architecture according to one embodiment of the invention.

For simplicity, data, databases, files, and data transactions may be referred to generally as Electronic mail (email), email transactions, mailboxes, etc. However, it should be understood that any type of email data or email transaction described below can be similarly performed for calendars, contacts, tasks, notes, electronic documents, files or any other type of data that needs to be transferred between a local network and a mobile device, FIG. 1 shows one embodiment of a real-time communication architecture 12 that includes a mobile network 14, an enterprise network 18, and a communication management system 16 that manages communications between the mobile network 14 and the enterprise network 18.

The enterprise network 18 in one instance is a private network that contains a firewall 31. The firewall 31 can be a set of related programs, located at a network gateway server that protects the resources of the enterprise network 18 from users from other networks. The term 'firewall' also implies the security policy that is used with the firewall programs.

The mobile network 14 includes mobile devices 21 that communicate over the Internet through a wireless or landline mobile network 14. Since mobile networks 14 are well known, they are not described in further detail.

The enterprise network 18 can be any business network, individual user network, or local computer system that maintains local email or other personal data for one or more users. In the embodiment shown in FIG. 1, the enterprise network 18 includes an email server 34 that is accessed by multiple Personal Computers (PCs) 38. In one example, the email server 34 may be a Microsoft® Exchange® server and the PCs 38 may access email on the email server 34 through a Microsoft® Outlook® software application. The email server 34 can store email mailboxes, contact lists, calendars, tasks, notes, or any other type of local data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor in the PC 38. The personal client 40 exchanges transactions with the mobile device 21 for browsing email, calendars, and contact information as well as accessing local files.

A communication management system 16 includes at least one management server 28 that manages the transactions between the mobile device 21 and the enterprise network 18. A user database 42 includes configuration information for different users. For example, the user database 42 may include login data for user's in enterprise network 18.

Enterprise Version

Figure 2:
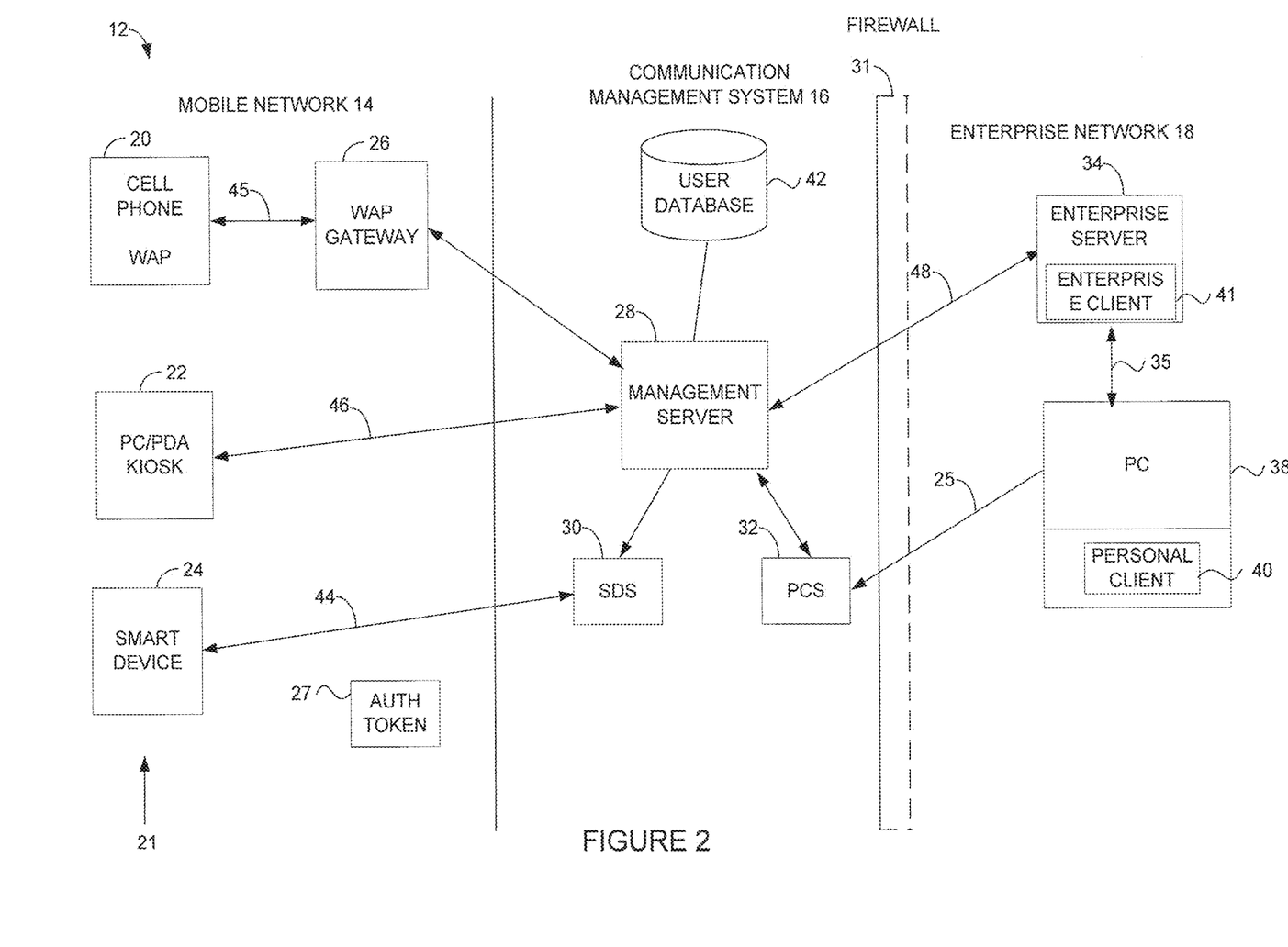
FIG. 2 is a block diagram of an enterprise version of the communication architecture.

FIG. 2 shows an enterprise version of the communication architecture 12. The enterprise network 18 includes an enterprise server 34 that connects through LAN connection 35 to multiple PCs 38. The enterprise server 34 also includes an enterprise client 41 that can communicate directly with the management server 28.

The communication management system 16 in FIG. 2 includes the management server 28, as well as one or more Smart Device Servers (SDS) 30, and one or more Personal Client Servers (PCS) 32. The SDS 30 handles communications with particular smart mobile devices 24. The PCS 32 manages communications with personal clients 40.

The mobile devices 21 in FIG. 2 are shown in more specificity and include cell phones 20 having WAP interfaces that communicate with management server 28 through a WAP gateway 26. Other mobile devices 21 may include PCs, PDAs, Internet kiosks 22, or any other smart mobile device 24 that operates as communication endpoints.

Mobile connection 23 in FIG. 1 and mobile connections 45, 46 and 44 in FIG. 2 are any connections that allow the mobile devices 21 to communicate over the Internet. For example, the connections 23, 44, 45 and 46 may be through landlines, cellular channels, 802.11 wireless channels, satellite channels, etc.

Continuous Real-Time Connectivity

Referring specifically to FIG. 1, the personal client 40 automatically establishes a continuous connection 25 between the PC 38 and management server 28. The personal client 40 initiates an outbound connection 25 which is then authenticated by the management server 28. For example, the client 40 presents an authentication token 29 to the management server 28. The management sever 28 then attempts to match the information in the authentication token 28 with information in user database 42.

If the authentication token 29 is authenticated, the connections 25 or 48 are established through the firewall 31 to achieve access to the management server 28 which is outside the private enterprise network 18. The management server 28 then sends the personal client 40 connection authorization and any other needed information. For example, the management server 28 may send back connection sharing information, email notification filters, and other mobile communication configuration parameters associated with a particular user.

The management server 28 and the personal client 40 then go into a quiescent mode until a transaction, such as a data query, is transferred between the mobile device 21 and the personal client 40. If for any reason the connection 25 is disconnected, the personal client 40 automatically establishes another connection 25 with management server 28.

It is important to note that the connection 25 is continuously maintained even when no connection 23 is currently exists between mobile device 21 and management server 28. In one embodiment, the connection 25 is a Transmission Control Protocol/Internet Protocol (TCP/IP) connection. However, any connection protocol can be used that allows continuous connectivity between the enterprise network 18 and communication management system 16.

In an alternative embodiment, the connection 25 may be established through a proxy server (not shown) in enterprise network 18. For example, messages sent by the personal client 40 may be encrypted by the proxy server with a Secure Sockets Layer (SSL).

After the connection 25 is established by the personal client 40, a mobile connection 23 can be established at any time between the mobile device 21 and the management server 28. After the mobile connection 23 is established, the mobile device 21 can then access email and other information in the email server 34 or memory 39 through personal client 40. Thus, after connection 25 is established, the personal client 40 effectively operates as an email server for the mobile device 21.

Referring to FIG. 2, in a manner similar to the personal client 40, an enterprise client 41 establishes a continuous connection 48 with the management server 48 similar to the connection 25 established between the personal client 40 and management server 28. The connection 48 is used for relaying transactions between multiple mobile devices 21 and multiple email users on enterprise server 34 at the same time.

In the version of the communication architecture shown in FIG. 2, the personal client 40 may establish connection 25 with the management server 28 through PCS 32 and certain mobile devices 24 may establish mobile connections 44 through the SDS 30.

Mobile Device Log-In

Referring to FIGS. 1 and 2, the management server 28 authenticates mobile connections 23, 44, 45, and 46 initiated by the mobile devices 21. When a user signs up for a mobile account, a copy of the user's username and password for the enterprise network 18 is stored in the user database 42. After the mobile device 21 powers on, the user is required to login to the communication management system 16 by entering another user name and password. If the mobile device 21 accesses email through the enterprise server 34, as opposed to through the PC 38, then an enterprise identifier (e.g., name) may also be required.

The mobile device 21 sends an authentication token 27 either directly to the management server 28 or to the SDS 30 which forwards the authorization token 27 to the management server 28. The management server 28 verifies information in the authorization token 27 with information in the user database 42. If the authentication token 27 is verified, the management server 28 sends an authorization acknowledgement directly to the mobile device 21 or through the SDS 30.

Once the mobile device 21 has successfully logged in, the management server 28 unlocks the user's enterprise user name and password. This allows the mobile device 21 to access email and other local files in the enterprise network 18 either through connection 25 or connection 48.

The management server 28 also conducts rendering and view functions needed for presenting email and other data to the different mobile devices 21. For example, the management server 28 reformats local data retrieved from the enterprise network 18 according to the particular mobile device 21 requesting the information. The management server 28 also operates as a transactional routing engine for routing transactions between the mobile devices 21 and the enterprise network 18.

Stateless Non-Replicated Connectivity

Figure 3:
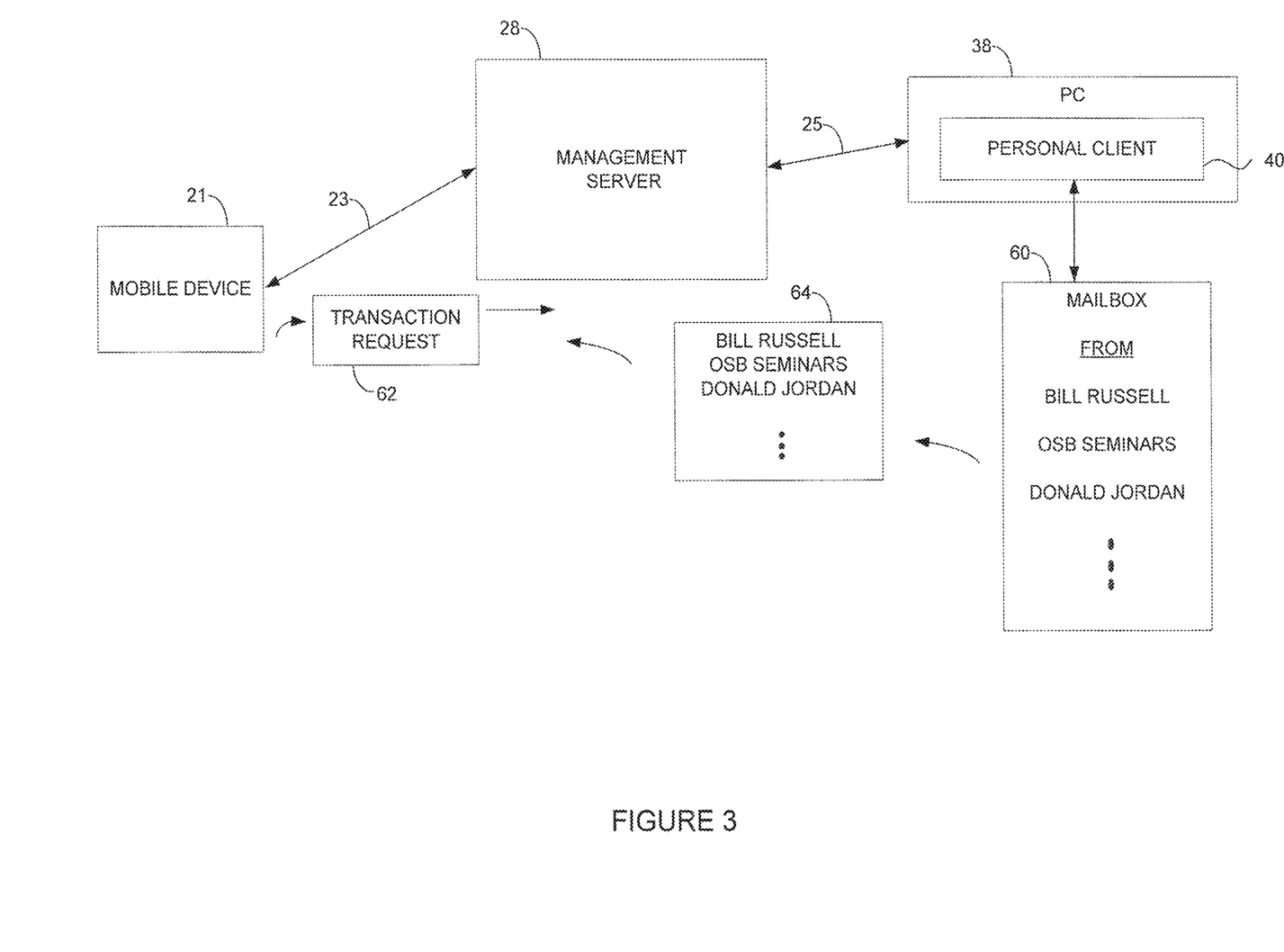
FIG. 3 is a block diagram showing how transactions are transferred in the communication architectures shown in FIGS. 1 and 2.

Referring to FIG. 3, once the mobile device 21 has successfully logged in, stateless connectivity exists between the mobile device 21 and the personal client 40 over connections 23 and 25. For example, the mobile device 21 may send a transaction request 62 to the personal client 40 to view emails in the users mailbox 60.

The transaction request 62 is sent from the mobile device 21 to the management server 28 over mobile connection 23. The management server 28 locates the personal client 40 associated with request 62 and forwards the request 62 over the appropriate connection 25. The personal client 40 accesses data in mailbox 60 according to the transaction request 62. For example, if the transaction request 62 requests viewing the user's latest emails, the personal client 40 generates an email list 64 containing the emails received in mailbox 60. The personal client 40 then sends the email list 64 back to the mobile device 21 through connection 25.

If the mobile device 21 has limited memory or viewing capability, only a latest portion of the emails in mailbox 60 may be included in email list 64. Alternatively, the personal client 40 may send all of the emails in mailbox 60 to the management server 28. The management server 28 then doles out portions of the email list 64 to the mobile device 21 according to the type of electronic platform used by the mobile device 21.

These transactions allow the mobile device 21 to view information in mailbox 60 in real time without having to maintain a second version of the emails in mailbox 60. Once the connection 23 is terminated, the email list 64 received by the mobile device 21 may be deleted. If emails in mailbox 60 need to be viewed again, the mobile device 21 sends a new transaction request 62 to the personal client 40.

If the items requested in transaction 62 are too numerous or too large for viewing by the mobile device 21, the personal client 40 may send only enough information in list 64 to identify the items. For example, the personal client 40 may glean out from an email the email sender information, when the email was sent, and the subject line. The personal client 40 may only send out this gleaned information for the latest emails received in mailbox 60.

The mobile device 21 receives the gleaned partial list 64 and can then select one or more of the items in list 64 for viewing. Depending on the type of data requested for viewing, another transaction request 62 may be sent from mobile device 21 to personal client 40 to view the selected email in its entirety. The personal client 40 then sends any remaining contents of that selected email to the mobile device 21. Alternatively, if the gleaned partial email list 64 does not contain the email that the mobile device user wishes to view, the mobile device 21 can send another transaction request 62 to the personal client 40 to view a second portion of the emails contained in mailbox 60.

After the transaction between the mobile device 21 and the management server 28 is completed, no emails from mailbox 60, or any other files from the PC 38 need to remain on the mobile device 21. That is unless the mobile device 21 saves a copy of the data. Thus, the servers 28, 30 and 32 and the mobile devices 21 shown in FIGS. 1-2 do not have to maintain a second version of the email data in mailbox 60.

This stateless connectivity does not require the large number of transactions that are typically required in store and forward architectures and also eliminates having to copy emails and send the copies to the mobile device each time an email is received at the user's mailbox.

Local Data File Access

Figure 4:
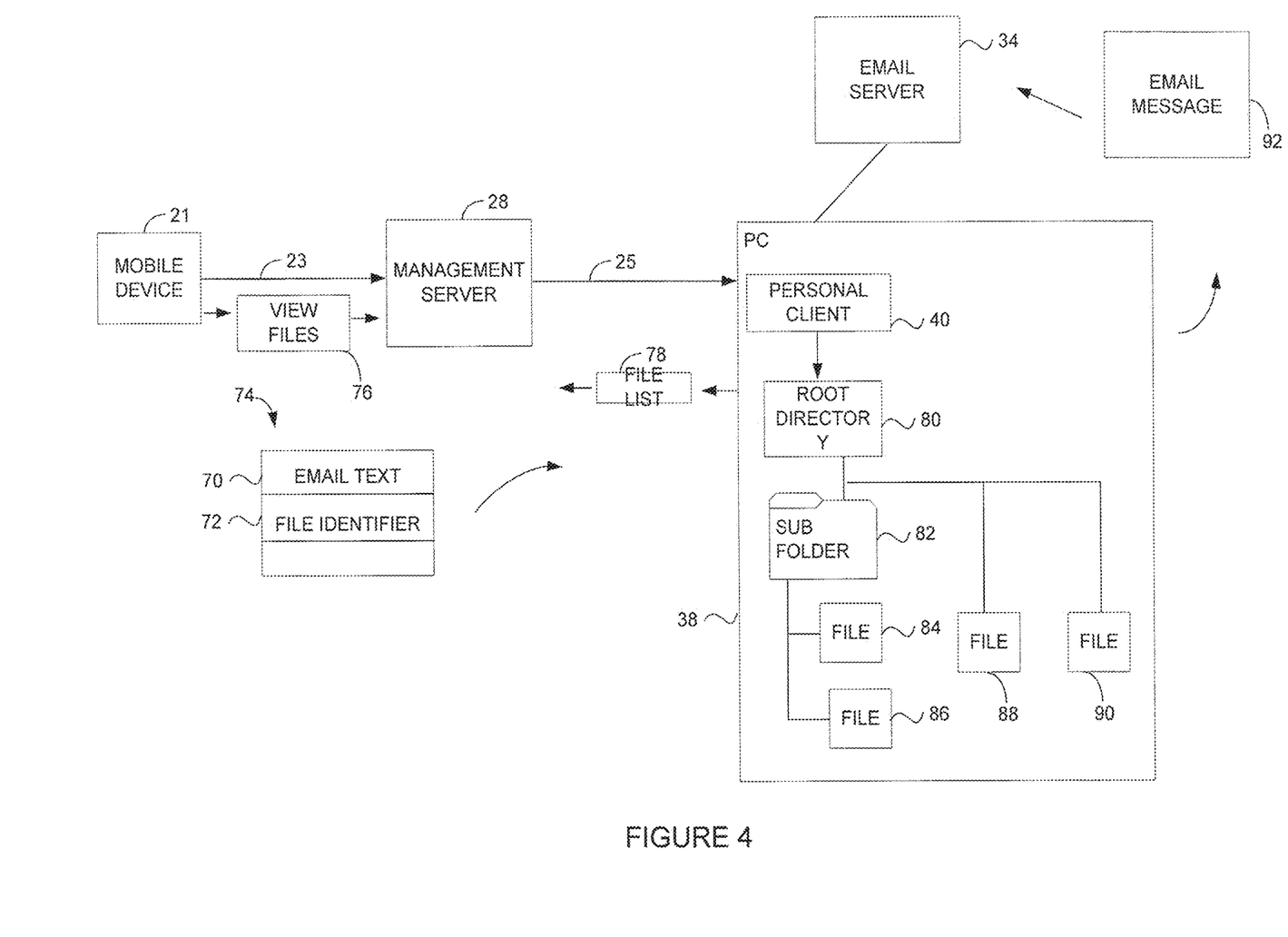
FIG. 4 is a block diagram showing how local network files are viewed and selected by a mobile device.

FIG. 4 shows how the mobile device 21 accesses local files contained on the PC 38 and attaches those local files to email messages. The personal client 40 operating on PC 38 is initially configured to point to a root directory 80. The root directory 80 may include multiple subfolders 82 that contain files 84 and 86. Other files 88 and 90 may be located at the top level of the root directory 80 or located in other subfolders.

Some mobile devices 21 may not have the capability to actually open and read the files in root directory 80 or there may be too much data in certain files for the mobile device 21 to store. In these situations, the mobile device 21 can still view, navigate and select folders and files located under the root directory 80.

An email message 70 is opened on the mobile device 21. An Insert File option may then be selected in the email application running on the mobile device 21. Selecting the Insert File option sends a view files transaction 76 from the mobile device 21 to the management server 28.

The management server 28 sends the transaction 76 over the appropriate connection 25 to personal client 40. The personal client 40 receives the transaction 76 and determines the mobile device 21 has requested a list of files in root directory 80. The personal client 40 generates a response containing a file list 78 identifying the subfolders 82 and files 84-90 in root directory 80. The response message containing file list 78 is then sent back to the mobile device 21 over connection 25.

All or part of the file list 78 may be sent to mobile device 21. For example, the management server 28 may determine the mobile device 21 has insufficient memory to view the entire file list 78. The management server 28 could also determine it would take too much time to send the entire file list 78 to the mobile device 21. In these cases, the management server 28 may only send a portion of the file list 78 to the mobile device 21.

The mobile device 21 displays the file list 78 received from the management server 28 and selects any of the listed files or subfolders. A subfolder in the file list 78 may be selected that contains files not included in the file list 78. This causes the mobile device 21 to send out another view file transaction 76 to the management server 28 requesting a list of the files contained in the selected subfolder. The management server 28, or personal client 40, then sends back another file list 78 containing the files in the selected subfolder.

If one or more files are selected from the file list 78, an associated file identifier 72 is inserted into the email message 70. In one example, selecting files is equivalent to a Hypertext Markup Language (HTML) forms submission where an item is selected from a website. When an email Send command is selected on the mobile device 21, an email transaction 74 is sent to the management server 28 that includes email message 70 and file identifier 72.

The management server 28 sends the email transaction 74 through connection 25 to the personal client 40. In the enterprise network shown in FIG. 2, the email transaction 74 may travel from the SDS 30 to the management server 28 and then through the PCS 32 and connection 25 to the personal client 40.

The personal client 40 unwraps the email transaction 74 and extracts the email message 70 containing the file identifier 72. The personal client 40 reformats the email message 70 into an email message 92 and then attaches the file in root directory 80 corresponding to file identifier 72. The email message 92 with the attached file is then sent by the personal client 40 to the email server 34. A copy of the email message 92 may also be copied to the Sent Items folder in the user's mailbox.

Storing Queries

Figure 5:
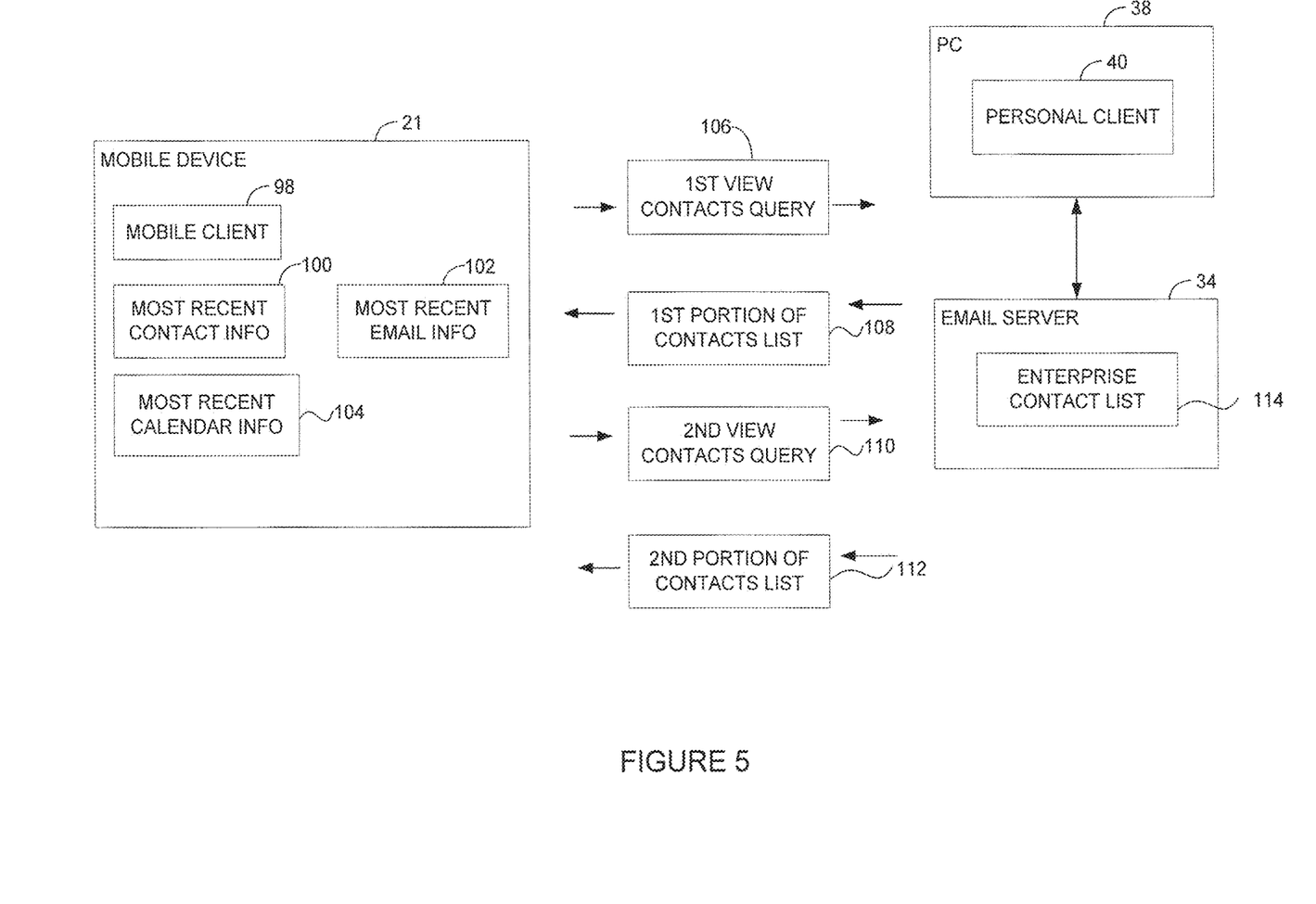
FIG. 5 is a block diagram showing how data is stored in a mobile device.

Referring to FIG. 5, some mobile devices 21 referred to as smart mobile devices may include software that operates a mobile client 98 that receives and transmits data. The mobile device 21 can store another version of the local data in email server 34. The stored data can include contact information stored in memory section 100, emails stored in memory section 102 and calendar information stored in memory section 104. The mobile device 21 can view, generate emails, and generally manipulate the data in memory section 100-104 off-line.

The mobile client 98 can maintain a latest version of queried data in memory section 100-104 using the stateless connectivity architecture described above. For example, when a View Contacts operation is initiated on the mobile device 21, the mobile client 98 sends a view contacts transaction 106 to the personal client 40. The mobile device 21 may have requested the contacts list 114 for the entire enterprise network. If the contacts list 114 is too large to send to the mobile device 21, the personal client 40 may only send back a first portion 108 of the contacts list. For example, a list of contacts for the first few letters of the alphabet.

If the contact the user is looking for is not within the first contacts list portion 108, the user can send a second View Contacts transaction 110 to the personal client 40. The second transaction 110 may identify a specific letter of the alphabet for the personal client 40 to query. Alternatively, the transaction 110 may direct the personal client 40 to send back a next portion of the enterprise contact list 114 immediately following contacts list portion 108. The personal client 40 sends back a second portion 112 of contact list 114 pursuant to the transactions 110. If the contact the user is looking for is in the second contact list portion 112, no further queries are sent from the mobile device 21.

The mobile client 98 can store the last received contact list portion 112 in memory 100. According to the amount of memory available in the mobile device 21, the mobile client 98 may save the last few contact list portions 112 and 108 in memory 100. Thus, when the mobile device 21 goes off-line, a user is still able to view the latest information received from personal client 40. The mobile client 98 can also save the most recent email queries in memory space 102 and the most recent calendar queries in memory space 104.

Synchronization

Figure 6:
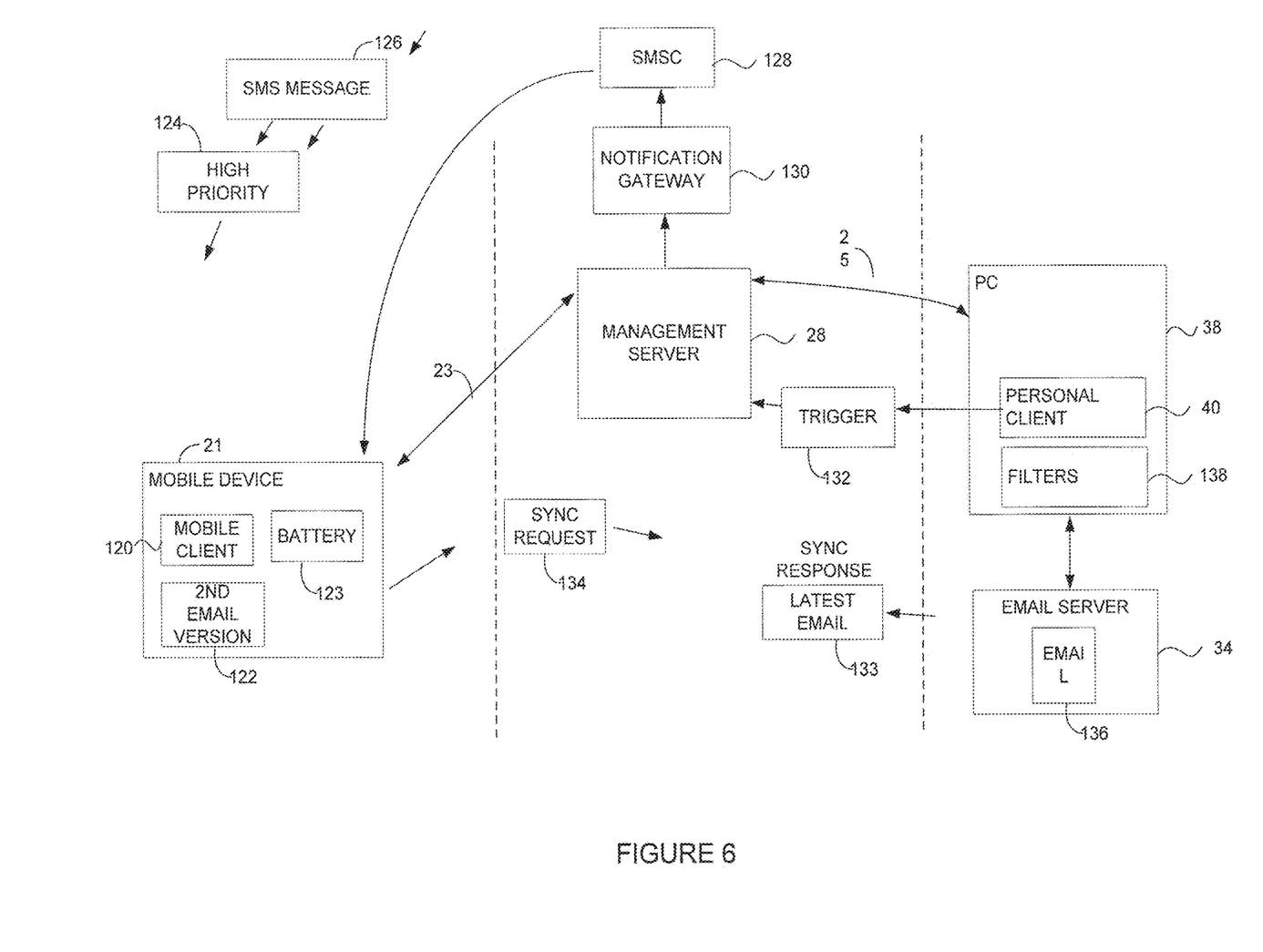
FIG. 6 is a block diagram showing how the mobile device is synchronized.

Referring to FIG. 6, the mobile device 21 may store a second version 122 of the user's local data. It may be necessary from time to time to synchronize the second version 122 on the mobile device 21 with the local version 136 on the email server 34. In one embodiment, the mobile device periodically sends out synchronization requests 134 to the personal client 40. The personal client 40 generates a response 133 pursuant to the synchronization request 134 that contains the latest emails, or other local user data. The response 133 is sent back to the mobile device 21 and is used for updating data 122.

Triggers can be used to notify the mobile device 21 when new emails arrive on the email server 34. Filters 138 are configured in the personal client 40 that identify the types of emails or other types of events that cause the mobile device 21 to send a trigger 132.

For example, the filters 138 may tell the personal client 40 to send a trigger 132 each time a new email arrives in the user's mailbox. The personal client 40 monitors the user's mailbox in email server 34 for new emails. If a new email is detected, the personal client 40 sends a trigger 132 to the mobile device 21 through the management server 28. The trigger 132 may be a message with no payload that simply tells the mobile device 21 that something new has happened in the user's mailbox. The trigger 132 causes the mobile device 21 to establish the mobile connection 23 with the management server 28 and then send a synchronization request transaction 134 to the personal client 40.

In one implementation, Short Message Service (SMS) messages 126 are used to trigger the mobile device 21 into establishing the mobile connection 23 and send the synchronization request transaction 134. The management server 28 is coupled through a notification gateway 130 to a Short Message Service Controller (SMSC) 128 operated by a mobile communication service carrier. In other implementations, some other notification protocol, such as a Wireless Application Protocol (WAP) Push is used to trigger the mobile device 21.

The personal client 40 generates the trigger message 132 whenever an event associated with the user's mailbox 136 corresponds with an event identified in filters 138. The trigger message 132 causes the management server 28 to send a message through the notification gateway 130 to the SMSC 128. The SMSC 128 accordingly sends the SMS message 126 to the mobile device 24.

The mobile device 21 monitors for particular SMS messages having some particular computer readable content. When SMS message 126 is received having that particular content, the mobile device 21 initiates a mobile connection with management server 28. The mobile device 21 may extract the SMS message 126 from a user queue before a user has a chance to see it.

The mobile device 21 initiates an authentication process with the management server 28. After successful authentication, the synchronization request 134 is sent from the mobile device 21 to the management server 28. The management server 28 transfers the request 134 to the personal client 40 over the previously established connection 25. The personal client 40 upon receiving the synchronization request 134 sends back a response 133 that includes a list of the latest emails in the user's mailbox 136.

High Priority Email

Still referring to FIG. 6, the connection architecture shown above can also be used for providing notification of high priority emails. The personal client 40 may be configured to monitor the email server 34 for particular types of email messages. For example, the filters 138 may cause the personal client 40 to look for any emails sent from a particular sender email address. For example, email sent from the user's supervisor.

Whenever an email arrives in the user's mailbox 136 sent from the supervisor's email address, the personal client 40 sends a stripped down version of that email through the management server 28 to the SMSC 128. For example, the stripped down version may only identify the sender, time, date, and subject line for the email message. The SMSC 128 then sends a SMS high priority message 124 to the mobile device 24.

The stripped down high priority SMS message 124 may be slightly different than the SMS message 126 used for triggering mobile device synchronization. For example, the SMS message 126 may not contain any email content, while the priority message 124 includes some portion of the actual email content received in mailbox 136. The high priority message 124 can be sent to any SMS capable mobile device.

Power Management

The mobile device 21 can periodically initiate synchronization according to an amount of charge remaining in a battery 123. For example, when battery 123 has a relatively large amount of charge remaining, the mobile device 21 may synchronize more frequently than when the battery 123 has a relatively small amount of charge remaining. Systems for determining an amount of charge remaining in battery are well known and are therefore not described in further detail.

Different charge gradient levels can be used for varying how often the mobile device 21 synchronizes with the personal client 40. For example, the mobile device 21 may synchronize every 5 minutes when the battery 123 has 75% or more charge remaining and may synchronize every 10 minutes when the battery 123 is between 75% and 50% charged. When the battery 123 is between 50% and 25% charged, the mobile device 21 may only synchronize with personal client 40 every 30 minutes. Other charge/synchronization rates can also be used.

To further conserve power, synchronization can be varied according to the day of the week. For example, the mobile device 21 may synchronize less often on weekends than on weekdays.

Summary

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

We claim:

1. A server that manages transactions between first and second end user devices, the server comprising:
   a communication interface;
   a processor communicatively coupled to the communication interface; and
   a memory communicatively coupled to the processor, the memory containing instructions executable by the processor whereby the server is operable to:
   receive a first connection associated with a first end user device, wherein the first connection includes a connection that is initiated by the first end user device, and wherein the first end user device is authenticated by matching information in an authentication token presented by the first end user device with previously stored information;
   receive a first message from the first end user device over the first connection, wherein the first connection is maintained independently of the first message, and wherein the first message is associated with a transaction requesting data from a second end user device;
   generate a second message for the second end user device based on the first message from the first end user device;
   send the second message to the second end user device;
   receive a second connection associated with the second end user device while the first connection is maintained,
      wherein the second connection includes a connection that is initiated by the second end user device;
   receive a third message from the second end user device over the second connection,
      wherein the third message is generated by the second end user device in response to receipt of the second message, and
      wherein the third message contains a latest version of data from the second end user device;
   generate a fourth message, wherein the fourth message includes data from the third message; and
   send the fourth message to the first end user device over the first connection;
   wherein stateless connectivity exists between the first end user device and the second end user device over the first connection and the second connection.

2. The server of claim 1, wherein the second connection is used to manage multiple transactions between the first end user device and the second end user device.

3. The server of claim 2, wherein the multiple transactions between the first end user device and the second end user device are managed in response to instructions from a user of the first end user device.

4. The server of claim 2, wherein at least one of the multiple transactions between the first end user device and the second end user device includes a request to receive additional data from the first end user device.

5. The server of claim 2, wherein at least one of the multiple transactions between the first end user device and the second end user device includes a request to receive additional data from a third device.

6. The server of claim 2, wherein at least one of the multiple transactions between the first end user device and the second end user device includes additional data for receipt by a third device.

7. The server of claim 2, wherein at least one of the multiple transactions between the first end user device and the second end user device includes additional data for receipt by the first end user device.

8. The server of claim 1, wherein the second message includes data from the first message.

9. The server of claim 1, wherein the server is operable to receive a third connection associated with the second end user device after the second message is sent to the second end user device.

10. The server of claim 9, wherein the server is operable to manage transactions between the first end user device and the second end user device over the first and third connection.

11. The server of claim 1, wherein the first connection is a TCP/IP connection.

12. The server of claim 1, wherein the server is operable to maintain the first connection regardless of whether the second connection is terminated.

13. The server of claim 1, wherein, upon termination of the first connection or completion of the transaction, the server is operable to delete data associated with the transaction.

14. A method for managing transactions between first and second end user devices, the method comprising:
- receiving, at a server, a first connection associated with a first end user device, wherein the first connection includes a connection that is initiated by the first end user device, and wherein the first end user device is authenticated by matching information in an authentication token presented by the first end user device with previously stored information;
- receiving, at the server, a first message from the first end user device over the first connection, wherein the first connection is maintained independently of the first message, and wherein the first message is associated with a transaction requesting data from a second end user device;
- generating, at the server, a second message for the second end user device based on the first message from the first end user device;
- sending the second message from the server to the second end user device;
- receiving, at the server, a second connection associated with the second end user device while the first connection is maintained,
  - wherein the second connection includes a connection that is initiated by the second end user device;
- receiving, at the server, a third message from the second end user device over the second connection,
  - wherein the third message is generated by the second end user device in response to receipt of the second message, and
  - wherein the third message contains a latest version of data from the second end user device;
- generating, at the server, a fourth message, wherein the fourth message includes data from the third message; and
- sending the fourth message from the server to the first end user device over the first connection;
- wherein stateless connectivity exists between the first end user device and the second end user device over the first connection and the second connection.

15. The method of claim 14, wherein the second connection is used to manage multiple transactions between the first end user device and the second end user device.

16. The method of claim 14, wherein the second message includes data from the first message.

17. The method of claim 15, wherein the multiple transactions between the first end user device and the second end user device are managed in response to instructions from a user of the first end user device.

18. The method of claim 15, wherein at least one of the multiple transactions between the first end user device and the second end user device includes a request to receive additional data from the first end user device.

19. The method of claim 15, wherein at least one of the multiple transactions between the first end user device and the second end user device includes a request to receive additional data from a third device.

20. The method of claim 15, wherein at least one of the multiple transactions between the first end user device and the second end user device includes additional data for receipt by a third device.

21. The method of claim 15, wherein at least one of the multiple transactions between the first end user device and the second end user device includes additional data for receipt by the first end user device.

22. The method of claim 14, further comprising receiving, at the server, a third connection associated with the second end user device after the second message is sent to the second end user device.

23. The method of claim 22, further comprising managing, by the server, transactions between the first end user device and the second end user device over the first and third connection.

24. The method of claim 14, wherein the first connection is a TCP/IP connection.

25. The method of claim 14, further comprising maintaining the first connection regardless of whether the second connection is terminated.

26. The method of claim 14, further comprising deleting data associated with the transaction upon termination of the first connection or completion of the transaction.

* * * * *